May 15, 1928.
F. S. FLOETER
AXLE LATHE
Filed March 12, 1924     3 Sheets-Sheet 1
1,670,109
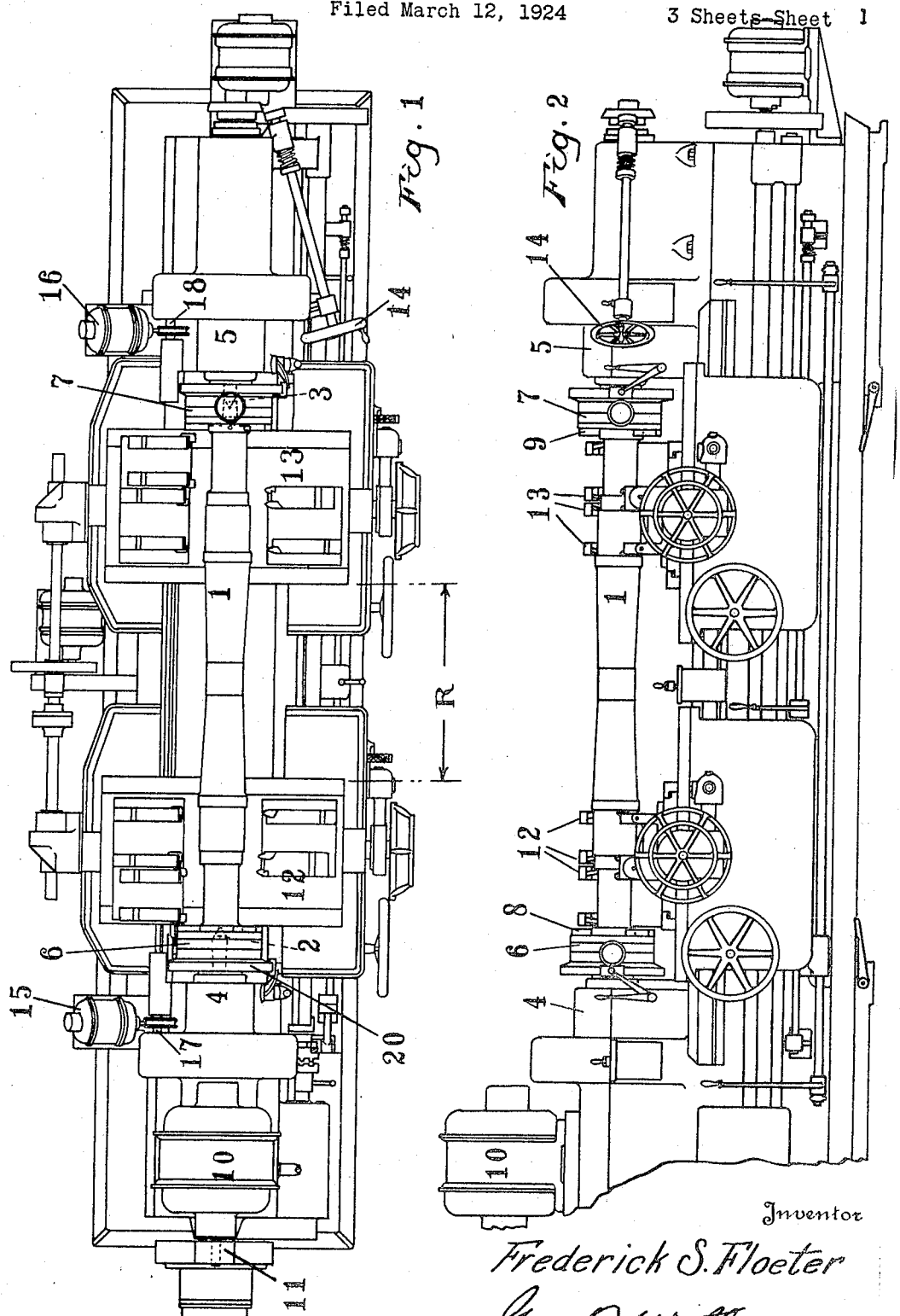
Inventor
Frederick S. Floeter
By Geo. B. Willcox.
Attorney May 15, 1928. 1,670,109

F. S. FLOETER

AXLE LATHE

Filed March 12, 1924    3 Sheets-Sheet 2

Inventor
Frederick S. Floeter
By Geo. B. Willcox
Attorney

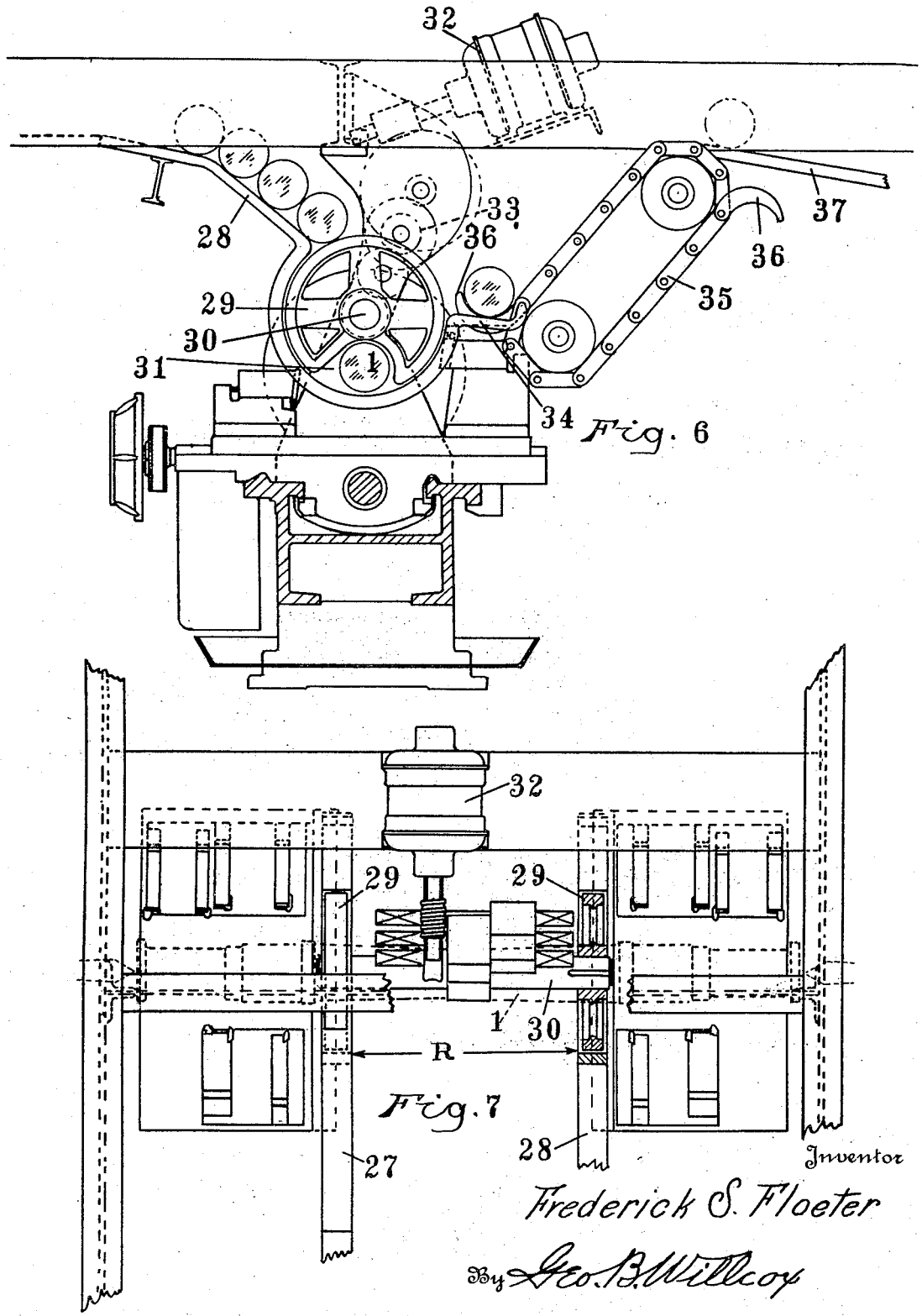

Patented May 15, 1928.

1,670,109

UNITED STATES PATENT OFFICE.

FREDERICK S. FLOETER, OF SAGINAW, MICHIGAN, ASSIGNOR TO WICKES BROTHERS, OF SAGINAW, MICHIGAN, A CORPORATION OF MICHIGAN.

AXLE LATHE.

Application filed March 12, 1924. Serial No. 698,676.

This invention relates to turning lathes and pertains more particularly to lathes adapted for turning wheel seats and journals at both ends of a car axle simultaneously, and for other work of like character, as for example, turning the ends and bearings of throw cranks and shafts, such as automobile engine cranks.

The objects of my invention are to provide an axle lathe of high production capacity adapted to accurately machine axles without setting up bending strains even though the axles be crooked or irregular.

A further object is to provide means for rapidly and automatically loading and unloading the lathe whereby the work is quickly centered, machined and then released and passed on to another machine for burnishing or other subsequent operations. This is accomplished without lifting the work by a crane or sluing or swinging the work into position between the lathe centers by hand, as is the common practice with center-driven lathes heretofore commonly employed for the service to which my invention is adapted.

In carrying out the foregoing objects I employ two tool carriages provided with power longitudinal feeds, and mount the work on lathe centers which are adjustable longitudinally and are preferably rotatable with the work, so that no wear occurs between the lathe center and the work itself.

My improvement also includes work clamping means, such as a self-centering chuck, at each lathe center, the chucks provided with mechanically operated devices for actuating jaws that clamp the work and release it. The chucks are also provided with retracting or equivalent means by which the chuck jaws when released can be moved clear of the ends of the work, so that the work can be lifted sidewise out of the lathe when finished, without sluing, twisting, or swinging it, as previously mentioned.

The chucks are adjustably arranged so that the jaws of a chuck can be retracted to clear the work at that end while the other chuck is driving the work. One end of the axle can then be finished. Upon releasing and retracting the second chuck and driving the work from the first chuck, the other end of the axle is also finished throughout.

By the mechanisms above referred to I do away with a large amount of the lifting and hand manipulation heretofore required in the machining of axles and similar pieces, making it possible for one operator to attain a production rate about four times greater than has heretofore been possible with center-driven lathes and to produce work accurately centered and finished, both ends being truly co-axial, even though the rough piece is crooked when put into the lathe.

With the foregoing and certain other objects in view which will appear later in the specifications, my invention comprises the devices described and claimed and the equivalents thereof.

In the drawings, Fig. 1 is a top plan view of my lathe with the work in place, the loading conveyor removed.

Fig. 2 is a side view of the same.

Fig. 6 is a side view of the conveyor for loading and unloading the lathe.

Fig. 7 is a top plan view of the parts shown in Fig. 6.

Figure 3:
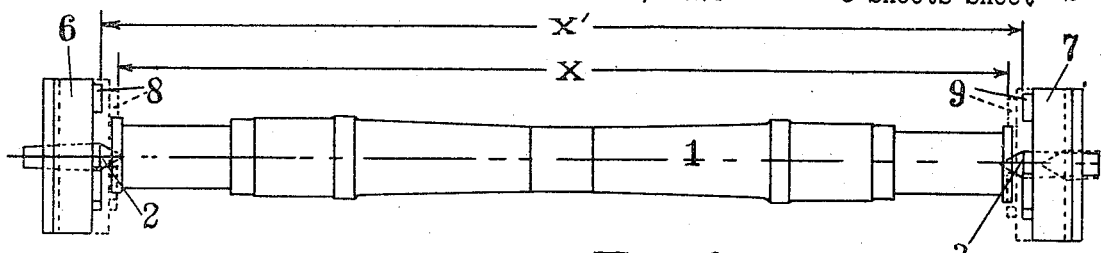
Fig. 3 is a diagrammatic view of the work mounted in withdrawable end chucks.

As is clearly shown in the drawings, 1 is the axle or other work to be machined. 2 and 3 are the lathe centers carried by the usual head-stocks 4 and 5. The lathe centers are preferably live, that is, rotatable with the work.

6 and 7 are revolvable chucks preferably provided with self-centering jaws 8 and 9 that grip the ends of the work. The chucks are revolved simultaneously from the motor 10 or other suitable source of power connected by gearing 11 and other suitable connections, not shown, to the chuck spindles.

12 and 13 are the tool carriages, equipped with power feed and the usual adjustments and cutting tools for machining both ends of the work simultaneously.

One of the lathe centers, as 3, can be longitudinally projected or retracted, as shown by dotted lines in Fig. 1, by means of the hand-wheel 14 and suitable connecting gearing which is not illustrated herein since it does not form an essential part of my invention as herein claimed.

In Fig. 3 I have illustrated diagrammatically the work 1 mounted on the lathe centers 2 and 3, also the retractable chucks 6 and 7.

The clamping position of the chuck jaws 8 and 9 is shown by dotted lines and their position when withdrawn to permit the removal of the work from the lathe is shown by full lines. X represents the distance between the chuck jaws 8 and 9 when they are gripping the work for driving and X' the distance between them when they are retracted to permit the work to be removed or inserted. In the part sectional view, Fig. 4, I have illustrated a preferred arrangement of the lathe center 2, the work 1 and the jaws 8 and 9 being shown in clamped position, together with chuck mechanism adapted to actuate the jaws as above described. The position of the same mechanism with the clamping jaws withdrawn is shown in Fig. 5. The mechanisms by which the jaws are actuated to clamp and release the work and by which the chuck is advanced or withdrawn may be varied without departing from my invention as claimed, but for purpose of illustration I employ the construction shown in Figs. 1, 4 and 5, where 15 and 16 are chuck actuating motors adapted to drive spline shafts 17 and 18, each having a slidable pinion 19 feathered thereon adapted to releasably engage and drive a gear 20 on the chuck when engaged therewith, as shown in Fig. 5.

Gear 20, revolvable on chuck 6, has a bevel gear 21 on its face meshing with pinions 22 that drive bevel pinions 23 which are in turn toothed to the spirally grooved ring 24 by which the jaws 8 are actuated radially inward and outward, as is common in self-centering chucks.

The spiral faced ring 24 is preferably floating, that is, it has capacity for slight sidewise movement in any direction so that when the jaws 8, preferably three in number, grip the work the ring 24 becomes equalized and will drive the work 1 without cramping it on the lathe centers 2 and 3.

Figure 4:
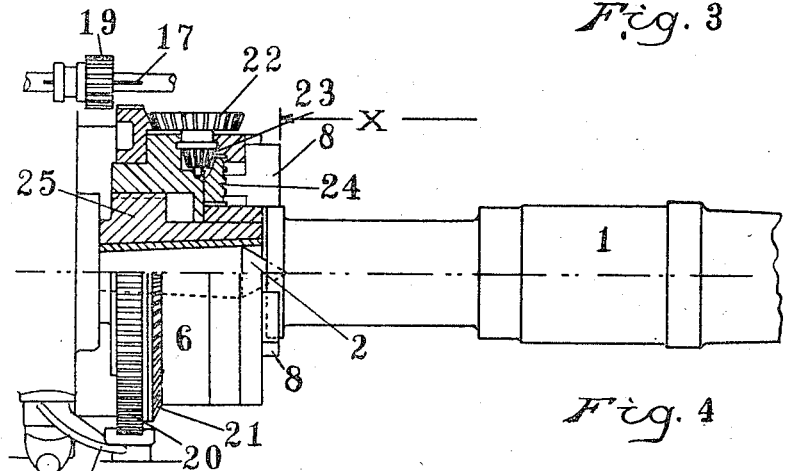
Fig. 4 is a part sectional detail of a chuck gripping the end of an axle.
Figure 5:
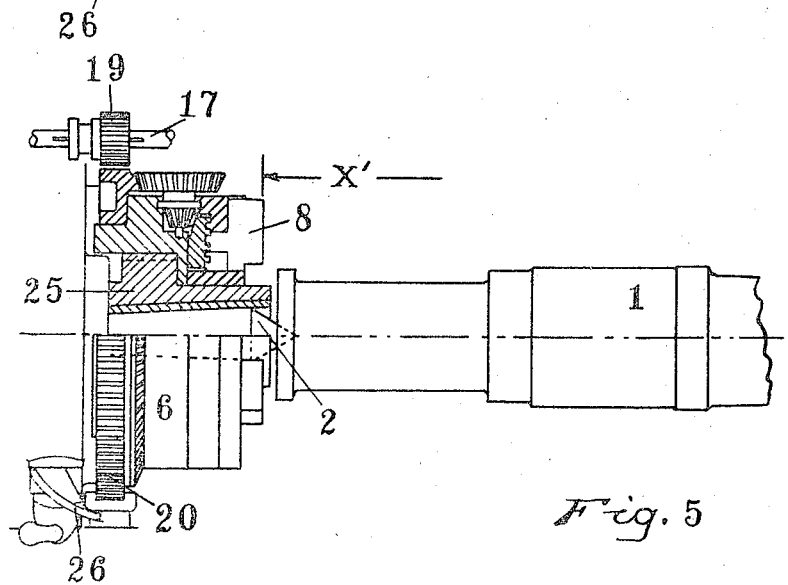
Fig. 5 is a similar view, the chuck withdrawn.

25 is a hollow revolvable lathe spindle upon which the chuck is splined, as shown in Figs. 4 and 5, whereby the chuck as a whole may be moved lengthwise on the spindle to retract or advance the jaws 8 with relation to the work 1. This lengthwise or axial shifting of the chuck is accomplished by means of a hand-operated shifting lever 26, or by any other suitable means.

The live centers 2 and 3, at least one of which is withdrawable, in combination with the chucks 6 and 7, either or both of which can be engaged with the work, or moved away or retracted so as to clear the work and permit its insertion or removal, forms an important part of my invention.

The combination provides for double centering, which insures accurate alinement, and end driving at both ends of the work simultaneously, thereby applying driving power as close as possible to the cutting tools and avoiding bending strains tending to deflect the work while being machined, and a clear bed plate space for loading and unloading.

In practice I engage both chucks and drive them simultaneously while machining the wheel seats and journals at both ends of a car axle. I then disengage and withdraw one chuck and machine that end of the axle while driving from the opposite chuck. In like manner the other end of the axle is machined, completing the work without disturbing its original setting on the lathe centers.

A still further and very important advantage is that no center driving head is required, the lathe bed between the centers 2 and 3 being entirely unobstructed and, therefore, available for the purpose of automatic loading and unloading, which will now be explained.

To produce a complete high rate production unit and to conserve floor space heretofore required for handling work into and out from axle lathes I apply to the lathe above described the automatic overhead loading and unloading device illustrated in Figs. 6 and 7, where 27, 28 are downwardly inclined skids or runways arranged above the lathe bed and extending across, as shown in Fig. 6. These runways are spaced apart as at R in Figs. 1 and 7, directly over the work space of the lathe bed. Each rail is formed to approximately circular or hoop shape to receive within its curve the loading wheel 29. A revolvable shaft 30 supported lengthwise above the lathe axis carries two of these loading wheels, each formed with a rim pocket 31. The shaft 30 may be driven by motor 32 connected to the shaft by suitable gearing 33 and controlled from the operator's position.

Axles or other work such as crank shafts or the like laid on the runways 27 and 28 normally rest upon the circular rims of wheels 29, 29, but when the wheels are turned so the pockets 31 arrive at the proper position they receive an axle 1 from the runways as in a cradle, and, guiding it downward and around the circular part of the runway, stop and deliver it, as shown in Fig. 6, approximately in register with the lathe centers 2 and 3. When these centers are advanced into the centering recesses at the ends of the work they automatically lift the work clear of the runways and the work then is free to revolve while its ends are being machined in the manner previously described. If the amount of lifting imparted to the work by the centers, as above noted, is not sufficient to enable the work to turn clear of the track, then the centering chucks when operated to grip the work will so lift it.

The machining operation being completed and the work having been released from the driving chucks and from the lathe centers, it is carried upward by the wheels 29 and delivered upon shoulders 34 provided at the delivery ends of the runways 27 and 28, as shown in Fig. 6.

A suitable chain conveyor or equivalent device 35, which may be provided with attachment links 36, and operated by motor 32 through suitable gearing, not shown, raises the finished piece of work from the shoulders 34 and delivers it to a rollway 37. It may travel to another lathe for further polishing or finishing operations if desired.

This loading and unloading device, the use of which is made possible by the centering and retractable chucks above described, automatically feeds the work into the lathe and upon its completion delivers it out from the lathe without any lifting cranes or other hand actuated devices, and without swinging the axle out of its original position, that is, parallel with the axis of the lathe. Consequently there is no lost motion or delay in the loading and unloading operations, and the productive speed of the lathe is greatly increased and its permanent accuracy of operation is assured.

Having thus described my invention, what I claim and desire to secure by Letters Patent is:

1. In combination, a lathe for machining axles and the like including a pair of lathe centers adapted to relative longitudinal movement, a work-chuck associated with each center and adapted to releasably grip an end of the work, the jaws of each chuck mounted so as to be axially withdrawable to clear the work and thereby permit free insertion and removal of the work from between both of said centers simultaneously, means located above the lathe and adapted to guide the work to position between said centers, and mechanisms adapted to control the movement of the work along said guiding means to said centers and to remove the finished work from said centers.

2. In combination, a lathe for machining axles and the like including a pair of live lathe centers each associated with a work-chuck adapted to releasably grip an end of the work, the jaws of each chuck mounted so as to be withdrawable to clear the work and permit free insertion and removal of the work from between both of said centers simultaneously, downwardly inclined runways located above the lathe and formed with a curved track adapted to guide the work to position between said centers, and loading wheels operating in conjunction with said curved track and adapted to control the movement of the work along said runways to said centers and to remove the finished work from between said centers.

3. In a lathe for machining axles and the like, a pair of live lathe centers, a work chuck associated with each center and adapted to releasably grip an end of the work, the jaws of each chuck withdrawably mounted to clear the work and permit free insertion and removal of the work from between both of said centers simultaneously, downwardly inclined runways having a curved track part at the axis of the lathe and shoulders at their delivery ends, power driven loading wheels operating in conjunction with said curved tracks and adapted to control the movement of the work along said runways to said centers and to remove the finished work from between said centers, and a chain conveyor having attachment links for lifting said work off from said shoulders.

4. In combination, a lathe for machining axles and the like including a pair of lathe centers adapted to relative longitudinal movement, a pair of lathe spindles and work-chucks associated with said centers and adapted to relative longitudinal movement on said spindles independently of said centers.

In testimony whereof, I affix my signature.

FREDERICK S. FLOETER.